United States Patent [19]

Hayashi

[11] Patent Number: 5,357,467
[45] Date of Patent: Oct. 18, 1994

[54] SECURITY CIRCUIT FOR PROTECTING DATA STORED IN MEMORY

[75] Inventor: Shuji Hayashi, Yokohama, Japan

[73] Assignee: Kabushiki Kaisha Toshiba, Kawasaki, Japan

[21] Appl. No.: 141,547

[22] Filed: Oct. 27, 1993

[30] Foreign Application Priority Data

Oct. 27, 1992 [JP] Japan .................. 4-288562
Oct. 7, 1993 [JP] Japan .................. 5-251502

[51] Int. Cl.$^5$ .............................................. G11C 13/00
[52] U.S. Cl. ........................ 365/189.05; 365/189.01
[58] Field of Search ............... 365/189.05, 189.01, 365/230.08, 182

[56] References Cited

U.S. PATENT DOCUMENTS 4,757,533 7/1988 Allen et al. ............ 365/189.05
5,081,675 1/1992 Kittirutsunetorn .

FOREIGN PATENT DOCUMENTS 0154252 9/1985 European Pat. Off. .
0449256 10/1991 European Pat. Off. .
0467355 1/1992 European Pat. Off. .
4-76749 3/1992 Japan .

Primary Examiner—Terrell W. Fears
Attorney, Agent, or Firm—Oblon, Spivak, McClelland, Maier & Neustadt

[57] ABSTRACT

A memory stores data, the contents of which must be kept secret. A memory stores security data and a latch circuit latches key data for releasing the security. A comparison circuit compares security data with key data, outputs a coincidence signal when they coincide with each other and outputs a non-coincidence signal when they do not coincide with each other. When a coincidence signal is output from the comparison circuit, an output signal of a change bit control circuit is set to the "0" level and address changing circuits change an address signal for reading out data from the memory according to the security data supplied from the memory.

14 Claims, 3 Drawing Sheets

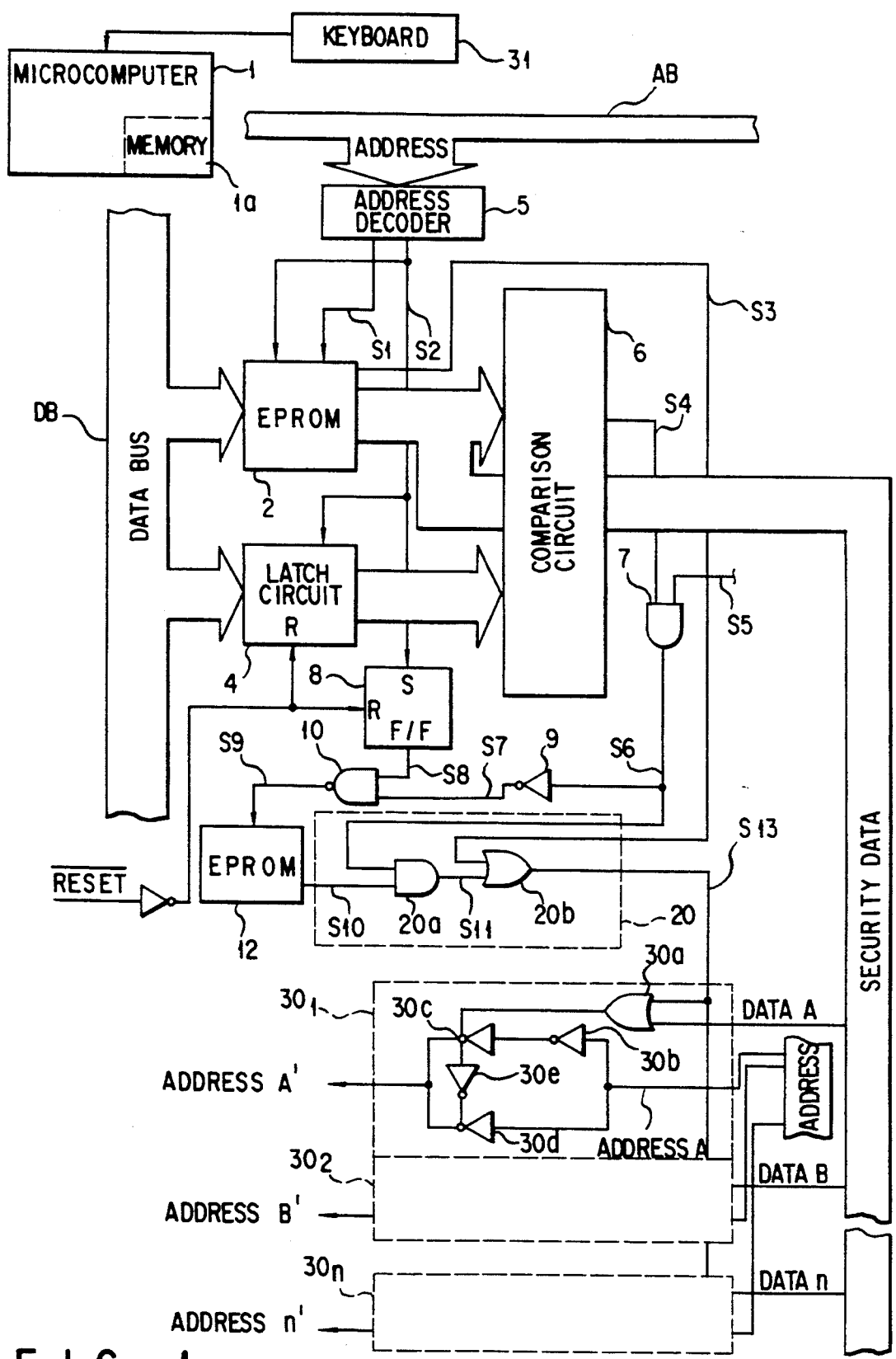
F I G. 1

SECURITY CIRCUIT FOR PROTECTING DATA STORED IN MEMORY

BACKGROUND OF THE INVENTION

1. Field of the Invention

This invention relates to a security circuit for protecting data written into a ROM (Read Only Memory) built in a one-chip microcomputer, for example. 2. Description of the Related Art A security circuit for protecting data stored in a memory built into a microcomputer has been developed. For example, the security circuit includes one type of security circuit which makes it impossible to read out data when it is operated and another type of security circuit which permits only the user who has set the security data to read out classified data, such as programs stored in the memory, and inhibits the other users from reading data, as is disclosed in Japanese Patent Disclosure No. H.4-76749 filed by the same applicant.

However, in either type of the above conventional security circuits, data cannot be read out when a user other than the user who has set the security data has accessed the memory. The other user quickly recognizes that the security is set in the memory.

Generally, if security data is input a number of times corresponding to the number of bits of security data set by the security circuit while changing the contents of the input key data, the security data may coincide with the input key data and will be released or destroyed. Therefore, if it is understood that the security is set in the memory, it is only a matter of time before data, stored in the memory, is read out by the other user and becomes difficult to protect the data stored in the memory.

SUMMARY OF THE INVENTION

An object of this invention is to provide a security circuit capable of preventing the other user from detecting that the security is set in a memory, protecting data stored in the memory.

The above object can be attained by use of a security circuit comprising: first storing means for storing data, the contents of which must be kept secret; second storing means for storing security data; a latch circuit for latching key data for releasing the security set by the security data; a comparison circuit for comparing the security data, stored in the second storing means, with the key data latched by the latching circuit, outputting a coincidence signal when the security data coincides with the key data, outputting a non-coincidence signal when the security data does not coincide with the key data; and an address control circuit supplied with an address for reading out data stored in the first storing means and an output signal from the comparison circuit, for changing the address signal when receiving a non-coincidence signal from the comparison circuit and outputting the address as it is when receiving a coincidence signal.

In the security circuit of this invention, since it is impossible to read out correct data from the storing means if correct key data is not input, a user, other than the user who has set the security, cannot read out correct data. Further, even if the key data does not coincide with the security data, some data is read out. Therefore, the other user cannot easily detect whether the security is set or not and thus data stored in the storing means can be securely protected.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a construction diagram showing a first embodiment of this invention;

DETAILED DESCRIPTION OF THE PREFERRED EMBODIMENTS

Figure 2:
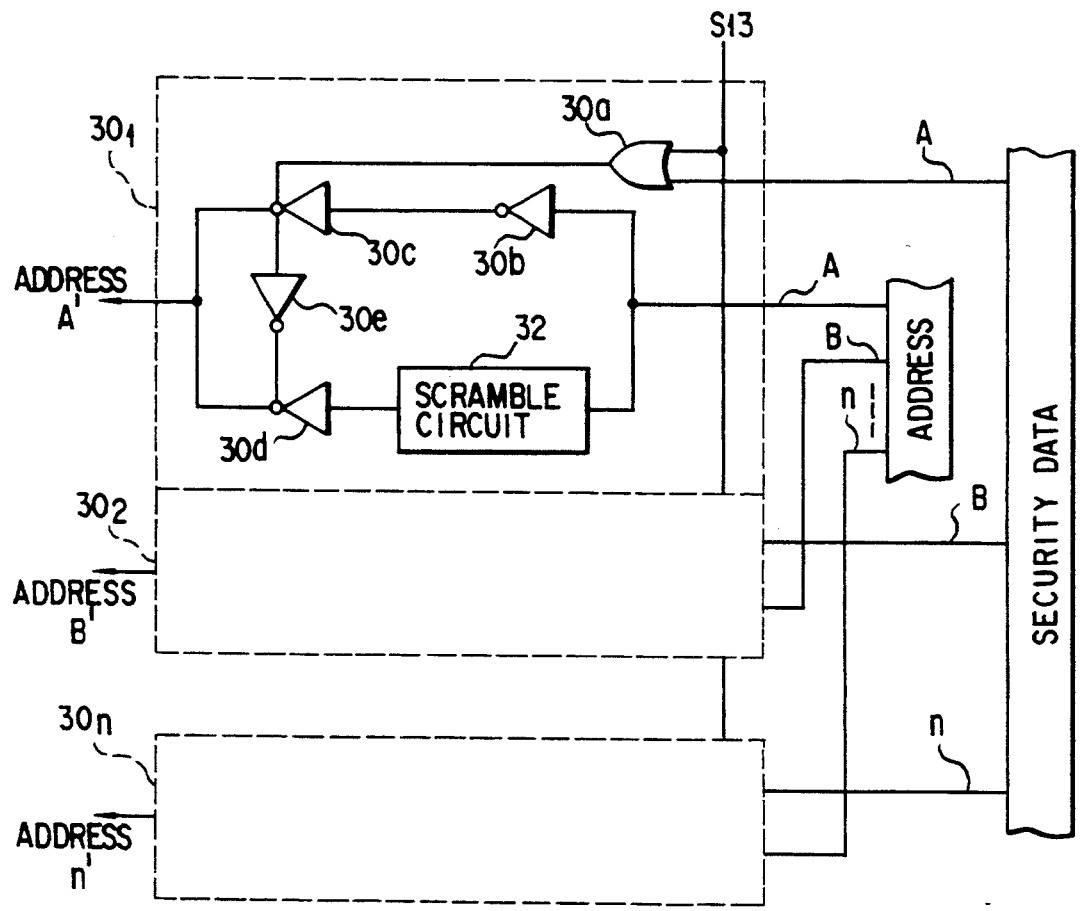
FIG. 2 is a construction diagram showing the main portion of a second embodiment of this invention.

There will now be described an embodiment of this invention with reference to the accompanying drawings.

FIG. 1 shows a first embodiment of this invention. In the circuit of FIG. 1, a memory 1a, such as an EPROM, is provided in a microcomputer 1. An address bus AB and data bus DB are connected to the microcomputer 1. A security circuit is used to protect data stored in the memory 1a. The security circuit is constructed by a memory 2, latch circuit 4, comparison circuit 6, AND circuit 7, flip-flop circuit 8, inverter circuit 9, NAND circuit 10, memory 12, change bit control circuit 20 and address changing circuit $30_l$ to $30_n$.

An address decoder 5 is connected to the address bus AB inorder to decode an address signal. The memory 2 and latch circuit 4 are connected to the data bus DB. The memory 2 is a non-volatile memory formed of an EPROM, for example, and is set into a write-in mode in response to a signal $S_1$, supplied from the address decoder 5 and set into a readout mode in response to a signal $S_2$. In the write-in mode, security data, supplied via the data bus DB for setting the security, is stored. The latch circuit 4 latches key data, supplied via the data bus DB, for releasing the security in response to a signal $S_2$, supplied from the address decoder 5 and reset in response to a reset signal supplied to the reset signal input terminal R. The security data and key data are input via a keyboard 31 connected to the microcomputer 1 and supplied to the data bus DB via the microcomputer 1. The number of bits of the key data is set to be the same as that of the security data.

The comparison circuit 6 is connected to the memory 2 and latch circuit 4. The comparison circuit 6 compares security data stored in the memory 2 with key data latched in the latch circuit 4. An output signal $S_4$, of the comparison circuit 6 is, supplied to one of the input terminals of the AND circuit 7 which receives a signal $S_5$ at the other input terminal thereof. The signal $S_5$ is set to the "1" level at the time of a write-in operation of the memory 12 which will be described later and set to the "0" level at other times. An output terminal of the AND circuit is connected to one of the input terminals of the NAND circuit 10 via the inverter circuit 9.

A signal $S_2$ output from the address decoder 5 is supplied to the set signal input terminal S of the flip-flop circuit (F/F) 8. The flip-flop circuit 8 is set in response to the signal $S_2$ and reset in response to a reset signal supplied to the reset signal input terminal R. The output terminal of the flip-flop circuit 8 is connected to the other input terminal of the NAND circuit 10. The output terminal of the NAND circuit 10 is connected to the input terminal of the memory 12. The memory 12 is a non-volatile memory constructed by a one-bit EPROM for example, and stores an output signal $S_9$ of the NAND circuit 10, that is, the result of comparison output from the comparison circuit 6.

The change bit control circuit 20 includes an AND circuit 20a and an OR circuit 20b. One of the input terminals of the AND circuit 20a is connected to the output terminal of the memory 12 and the other input terminal thereof is connected to the output terminal of the AND circuit 7. The output terminal of the AND circuit 20a is connected to one input terminal of the OR circuit 20b, which is connected at the other input terminal to the output terminal of the memory 2. A signal $S_3$, indicating the state of storage of the memory, is output from the memory 2. The signal $S_3$ is set to "0" when security data is stored in the memory 2.

The number of address changing circuits $30_l$ to $30_n$ provided is set to the same number as that of the bits of security data stored in the memory 2, for example. Since the address changing circuits $30_l$ to $30_n$ have the same construction, the construction of the address changing circuit $30_l$ is explained as an example.

The address changing circuit $30_l$ includes an OR circuit 30a and inverter circuits 30b, 30c, 30d, 30e. One input terminal of the OR circuit 30a is connected to the output terminal of the OR circuit 20b, constructing the change bit control circuit 20, and the other input terminal of the OR circuit 30a is connected to receive one-bit data among the security data output from the memory 2. That is, the other input terminal of each of the OR circuits 30a, constructing the address changing circuits $30_l$ to $30_n$, is supplied with a corresponding bit data of the security data read out from the memory 2.

The inverter circuits 30b, 30c are serially connected and the inverter circuit 30d is connected in parallel with a series circuit of the inverter circuits 30b, 30c. The inverter circuits 30c, 30d are so-called "clocked inverter circuits", and the clock signal input terminal of the inverter circuit 30c is connected to the output terminal of the OR circuit 30a and the clock signal input terminal of the inverter circuit 30d is connected to the output terminal of the OR circuit 30a via the inverter circuit 30e. Therefore, the inverter circuit 30c is operated when a level "1" signal is output from the OR circuit 30a and the inverter circuit 30d is operated by a level "1" signal, which is obtained by inverting a level "1" signal output from the OR circuit 30a by use of the inverter circuit 30e. The input terminals of the inverter circuits 30b, 30d are supplied with one-bit data from an address signal used for accessing the memory 1a of the microcomputer 1. The address changing circuit $30_l$ outputs an input address signal as it is when the inverter circuit 30c is selected by an output signal of the OR circuit 30a, and inverts an input address signal and then outputs the inverted signal when the inverter circuit 30d is selected by an output signal of the OR circuit 30a.

The operation of the circuit with the above construction is explained.

First, the operation effected in a case wherein the security is not set, that is, where security data is not stored in the memory 2 is explained.

In this case, the signal $S_3$ supplied from the memory 2 to one input terminal of the OR circuit 20b of the change bit control circuit 20 is set at the "1" level. Therefore, a signal $S_{13}$ output from the OR circuit 20b is set at the "1" level, irrespective of the level of the signal at the other input terminal. The signal $S_{13}$ is supplied to one input terminal of each of the OR circuits 30a, constructing the respective address changing circuits $30_l$ to $30_n$. When the signal $S_{13}$ is set at the "1" level, an output of the OR circuit 30a is set to the "1" level so as to set the inverter circuit 30c into the operative state and to set the inverter circuit 30d into the non-operative state. As a result, the relation between address signals A, B, - - - , n supplied to the address changing circuits $30_l$ to $30_n$ and address signals A', B', - - - , n' output from the address changing circuits $30_l$ to $30_n$ is set such that A=A', B=B', - - -, and n=n', and the address signals are kept unchanged even after they have passed the address changing circuits $30_l$ to $30_n$. Thus, data stored in the memory 1a of the microcomputer 1 can be read out correctly.

Next, the operation effected in a case wherein the security is set, is explained.

When an address for the memory 2 is supplied from the microcomputer 1 to the address bus AB, a signal $S_1$, output from the address decoder 5, is set at the "0" level and the memory 2 is set in the write-in mode. In this state, security data supplied from the microcomputer 1 to the data bus DB is stored into the memory 2. Then, a signal $S_3$ output from the memory 2 is set at the "0" level.

If data stored in the memory 1a built in the microcomputer 1, is read out in a state wherein security data is stored in the memory 2, key data is input by use of the keyboard 31, for example. When key data is input, the key data is supplied from the microcomputer 1 to the data bus DB and an address of the latch circuit 4 is supplied to the address bus AB. A signal $S_2$, corresponding to the address, is output from the address decoder 5 and is then supplied to the memory 2, latch circuit 4, and flip-flop circuit 8. Following that, the memory 2 is set into the readout mode and the flip-flop circuit 8 is set into the set state. At this time key data is latched into the latch circuit 4.

The comparison circuit 6 compares security data stored in the memory 2 with key data latched in the latch circuit 4. When the compared data items coincide with each other, a signal $S_4$ of "1" level is output from the comparison circuit 6, and when they do not coincide with each other, a signal $S_4$ of "0" level is output. The signal $S_4$ is supplied to the AND circuit 7. Further, a signal $S_5$ supplied from the exterior to the AND circuit 7 is set at the level "1" since a write-in voltage $V_{pp}$ is applied to the memory 12.

Assume now that the signal $S_5$ is set at the level "1" and that the security data and key data coincide with each other, that is; the signal $S_4$ is set at the "1" level. Then, an output signal $S_6$ of the AND circuit 7 is set at the level "1" and an output signal $S_7$ of the inverter circuit 9 is set at the "0" level. Since the flip-flop circuit 8 is set in the set state, the output signal $S_8$ thereof is set at the level "1". Therefore, an output signal $S_9$ of the NAND circuit 10, is set at the level "1" and the operation of writing data into the memory 12 is not effected.

when the memory 12 is set in the non-write-in state, the threshold voltage of the EPROM, constructing the memory 12, is low and the EPROM is made conductive. Therefore, a signal $S_{10}$ supplied from the memory 12 to the AND circuit 20a of the change bit control circuit 20 is set at the "0" level. At this point, since a signal $S_6$, supplied from the AND circuit 7 to the AND circuit 20a, is set at the "1" level, a signal $S_{11}$, supplied from the AND circuit 20a to the OR circuit 20b, is set at the "1" level and an output signal $S_{13}$ of the OR circuit 20b is also set to the level "1". Therefore, as in the case where the security is not set, all of the address signals output from the address changing circuits $30_l$ to $30_n$ are kept unchanged and data stored in the memory 1a of the microcomputer 1 can be read out correctly.

On the other hand, if it is detected, as the result of the comparison result 6, that security data and key data do not coincide with each other; a "0" level signal $S_4$ is output from the comparison circuit 6. Therefore, an output signal $S_6$, of the AND circuit 7, is set at the "0" level and an output signal $S_7$, of the inverter circuit 9, is set at the level "1". Further, since the signal $S_8$ is set at the level "1", an output signal $S_9$ of the NAND circuit 10 is set at the "0" level and the memory 12 is set into the write-in state.

When the memory 12 is set into the write-in state, the threshold voltage of the EPROM, constructing the memory 12, rises and the EPROM become non-conductive. As a result, a signal $S_{10}$ supplied from the memory 12 to the AND circuit 20a is set at the "0" level and an output signal $S_{11}$ of the AND circuit 20a is set at the "0" level. Further, since security data is stored in the memory 2 and the signal $S_3$ is set at the "0" level, an output signal $S_{13}$ of the OR circuit 20b is set at the "0" level.

Therefore, the signal $S_{13}$ is kept set at the "0" level and output signals of the OR circuits 30a, constructing the address changing circuits 30l to $30_n$, are changed according to security data supplied from the memory 2. For example, when bit data A of the security data is set at the "0" level, an output signal of the OR circuit 30a is set at the "0" level so as to set the inverter circuit 30c into the non-operative state and set the inverter circuit 30d into the operative state. Therefore, an address signal A', obtained by inverting the address signal A, is output from the address changing circuit 30l. Further, when the value of bit data A of the security data is set at the "1" level, the address signal A' becomes equal to the address signal A. This also applies to the address signals B' to n', which are inverted or set at the same value, according to the values of bit data B to n of the security data.

Thus, if security data is set and at least one bit of the security data is set at the "0" level, an address signal corresponding to the bit is inverted and the normal data readout operation cannot be effected.

According to the above embodiment, when security data is set, the user who has set the security can correctly read out data stored in the memory of the microcomputer by inputting correct key data. However, if the other user inputs incorrect key data, then it becomes impossible to correctly read out data stored in the memory of the microcomputer, so that data content can be kept secret.

Further, even when the other user inputs wrong key data, or in the extreme case, when key data is not input, some data can still be read out from the memory of the microcomputer and therefore, it becomes difficult to determine whether the security has been set or not. As a result, the possibility that correct data is read out by the other user is further reduced and the maintenance and management of data can be attained while keeping the data content secret.

FIG. 2 shows the main portion of the second embodiment of this invention and portions which are the same as those of FIG. 1 are denoted the same reference numerals. In this embodiment, a scramble circuit is provided in each of the address changing circuits $30_l$ to $30_n$. That is, a scramble circuit 32 is provided in the preceding stage of the inverter circuit 30d in each of the address changing circuits $30_l$ to $30_n$.

With the above construction, when key data and security data do not coincide with each other, an address signal input to the address changing circuits $30_l$ to $30_n$ is output after being scrambled by the respective scramble circuits 32. Therefore, according to this embodiment, an address signal output from the address changing circuits $30_l$ to $30_n$ becomes more irregular in comparison with the case of the first embodiment and the possibility that correct data could be read out by the other user is further reduced.

Figure 3A:
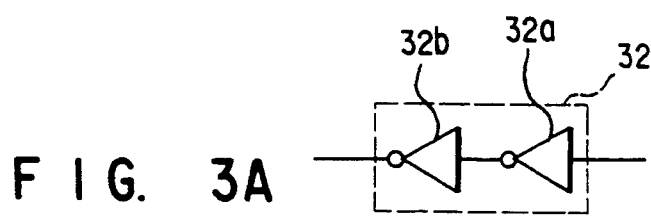
FIGS. 3A and 3B are circuit diagrams showing examples of a scramble circuit shown in FIG. 2.
Figure 3B:
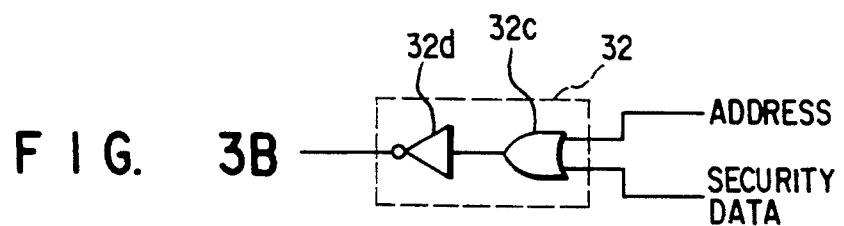

FIG. 3 shows an example of the scramble circuit 32. FIG. 3A shows an example in which inverter circuits 32a and 32b are serially connected. FIG. 3B shows an example in which an OR circuit 32c and an inverter circuit 32d are serially connected, one input terminal of the OR circuit 32c is supplied with one bit from among the address signal and the other input terminal thereof is supplied with one bit from among the security data.

The construction of the scramble circuit 32 is not limited to the above examples and can be variously modified. Further, the construction of each of the scramble circuits 32, provided in the respective address changing circuits $30_l$ to $30_n$, is not necessarily the same and it is possible to change the number of inverter circuits for each of the address changing circuits $30_l$ to $30_n$ or use another logic circuit such as an AND circuit instead of the OR circuit.

Figure 4:
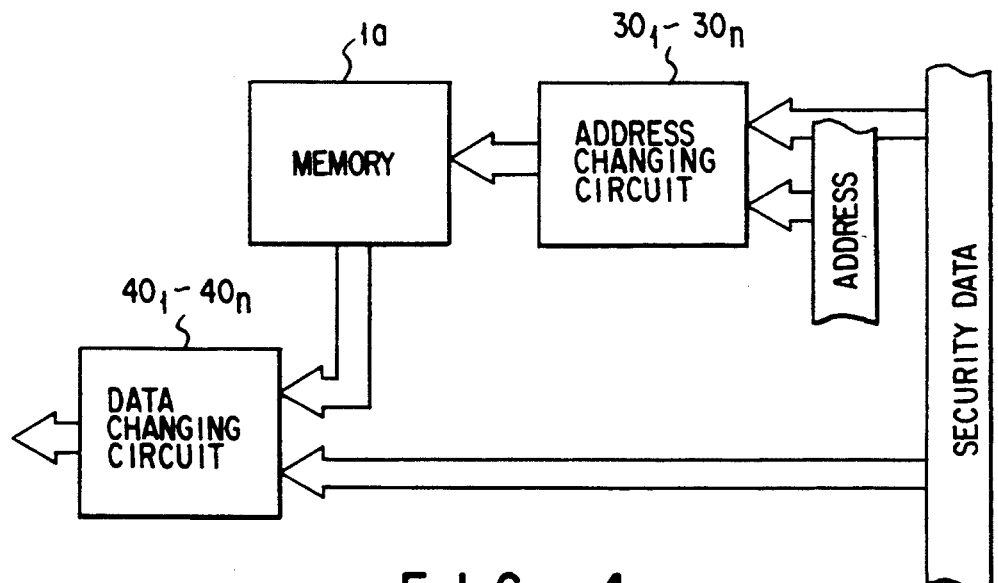
FIG. 4 is a construction diagram showing the main portion of a third embodiment of this invention.

FIG. 4 shows the main portion of a third embodiment of this invention and portions which are the same as those of the first and second embodiments are denoted by the same reference numerals.

In the first and second embodiments, the address signal of the memory 1a is changed according to security data. In the third embodiment, when the security is set, the address signal and data read out from the memory 1a is changed. That is, data changing circuits $40_l$ to $40_n$ are connected to the memory 1a. The number of the data changing circuits $40_l$ to $40_n$ corresponds to the bit number of data read out from the memory 1a, for example. The data changing circuits $40_l$ to $40_n$ are supplied with data read out from the memory 1a with security data and the data read out from the memory 1a is changed according to the security data.

Figure 5:
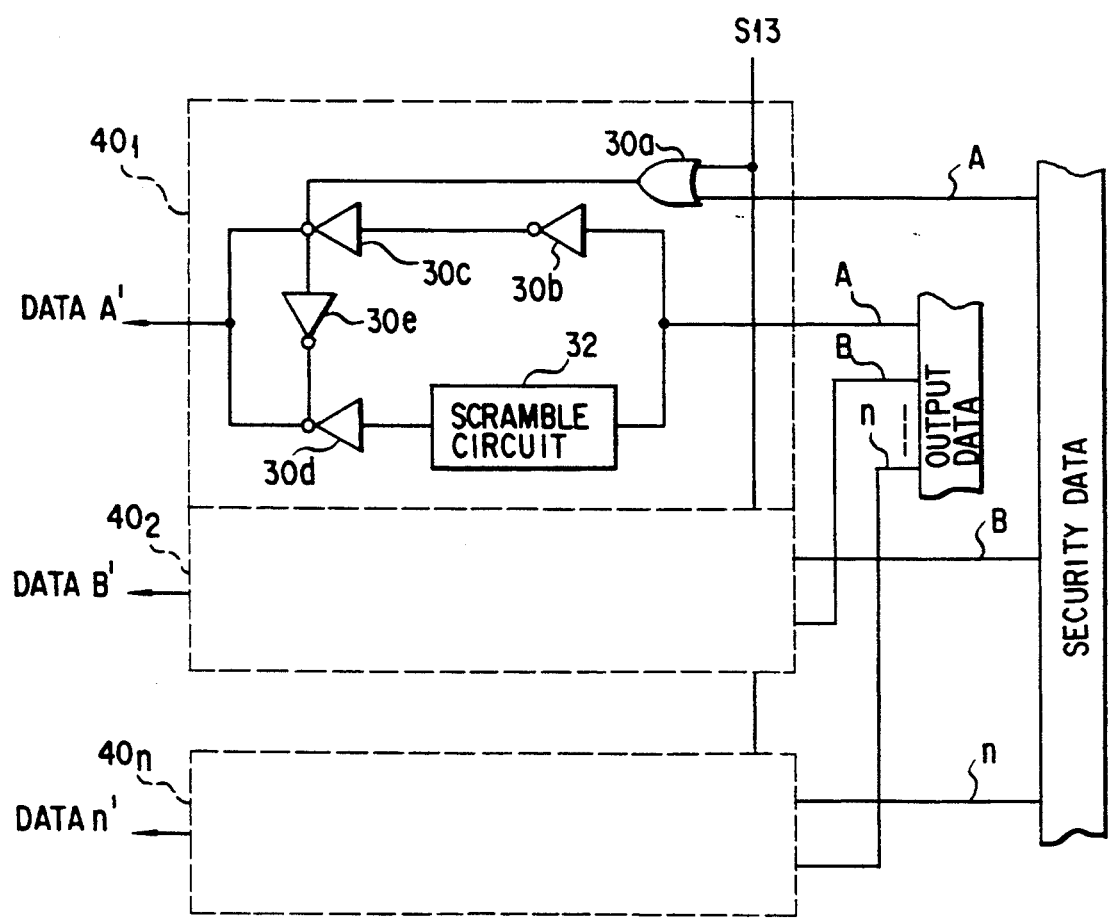
FIG. 5 is a construction diagram showing an example of a data changing circuit shown in FIG. 4.

FIG. 5 shows an example of the data changing circuits $40_l$ to $40_n$. Since the data changing circuits $40_l$ to $40_n$ are almost the same as the address changing circuits $30_l$ to $30_n$, portions which are the same as those of FIG. 2 are denoted by the same reference numerals.

The data changing circuits $40_l$ to $40_n$ are different from the address changing circuits $30_l$ to $30_n$ only in the input signals supplied to the inverter circuit 30b and scramble circuit 32. That is, in the data changing circuits $40_l$ to $40_n$, one bit from among data read out from the memory 1a is supplied to the inverter circuit 30b and scramble circuit 32. The data changing circuits $40_l$ to $40_n$ change data read out from the memory 1a according to the security data when the security data is set and the security data and input key data do not coincide with each other.

According to the third embodiment, both the address signal and data read out from the memory 1a are changed according to the security data. Therefore, it becomes more difficult to read out correct data when taken in comparison with the case of the first and second embodiments. Further, it becomes more difficult for the third party to analyze the security data, thereby making it possible to keep the contents of data secret.

Further, like the second embodiment, in the third embodiment, the scramble circuit 32, can be variously modified.

In the first to third embodiments, the security for the memory built in the microcomputer is explained, but this invention is not limited to the above embodiments and can be applied to the security for ordinary memories.

In addition, it is possible to variously modify this invention without departing from the technical scope thereof.

What is claimed is:

1. A security circuit comprising:
first storing means for storing data, the contents of which must be kept secret;
second storing means for storing security data;
a latch circuit for latching key data for releasing the security set by the security data;
a comparison circuit for comparing the security data stored in said second storing means with the key data latched by said latching circuit, outputting a coincidence signal when the security data coincides with the key data, and outputting a non-coincidence signal when the security data does not coincide with the key data; and
an address control circuit supplied with an address signal for reading out data stored in said first storing means and an output signal from said comparison circuit, for changing the address signal when receiving a non-coincidence signal from said comparison circuit and outputting the address signal as it is when receiving a coincidence signal.

2. A circuit according to claim 1, wherein said address control circuits includes a plurality of address changing circuits which are supplied with the address signal, security data and an output signal of said comparison circuit which changes the address signal according to the security data when a non-coincidence signal is supplied from said comparison circuit.

3. A circuit according to claim 2, wherein each of said address changing circuits includes a scramble circuit for freely changing the address.

4. A circuit according to claim 3 wherein said scramble circuit includes a plurality, of inverter circuits for changing the address signal.

5. A circuit according to claim 3, wherein said scramble circuit includes a logic circuit having an input terminal supplied with the address signal and the other input terminal supplied with the security data.

6. A circuit according to claim 1, further comprising a data changing circuit connected to an output terminal of said first storing means and supplied with data read out from said first storing means and the security data, said data changing circuit changing data read out from said first storing means according to the security data when a non-coincidence signal is supplied from said comparison circuit.

7. A security circuit comprising:
first storing means for storing data, the contents of which must be kept secret;
second storing means for storing security data having a plurality of bits;
a latch circuit for latching key data for releasing the security set by the security data;
a comparison circuit for comparing the security data stored in said second storing means with the key data latched by said latching circuit, outputting a coincidence signal when the security data coincides with the key data, and outputting a non-coincidence signal when the security data does not coincide with the key data; and
a plurality of address changing circuits each supplied with a corresponding one bit of an address signal for reading out data stored in said first storing means, a corresponding one bit of the security data and an output signal from said comparison circuit, for changing the address signal when receiving a non-coincidence signal from said comparison circuit and outputting the address signal as it is when receiving a coincidence signal.

8. A circuit according to claim 7, wherein each of said address changing circuits includes a scramble circuit for changing the address at random.

9. A circuit according to claim 8, wherein said scramble circuit includes a plurality of inverter circuits for changing the address signal.

10. A circuit according to claim 8, wherein said scramble circuit includes a logic circuit having an input terminal supplied with the address signal and the other input terminal supplied with the security data.

11. A security circuit comprising:
first storing means for storing data the contents of which must be kept secret;
second storing means for storing security data having a plurality of bits;
a latch circuit for latching key data for releasing the security set by the security data;
a comparison circuit for comparing the security data stored in said second storing means with the key data latched by said latching circuit, outputting a coincidence signal when the security data coincides with the key data, and outputting a non-coincidence signal when the security data does not coincide with the key data;
a plurality of address changing circuits each supplied with a corresponding one bit of an address signal for reading out data stored in said first storing means, a corresponding one bit of the security data and an output signal from said comparison circuit, for changing the address signal when receiving a non-coincidence signal from said comparison circuit and outputting the address signal as it is when receiving a coincidence signal; and
a plurality of data changing circuits connected to an output terminal of said first storing means and supplied with data read out from said first storing means and the security data, for changing the data read out from said first storing means according to the security data when receiving a non-coincidence signal from said comparison circuit.

12. A circuit according to claim 11, wherein each of said address changing circuits includes a scramble circuit for changing the address at random.

13. A circuit according to claim 12, wherein said scramble circuit includes a plurality of inverter circuits for changing the address signal.

14. A circuit according to claim 12, wherein said scramble circuit includes a logic circuit having an input terminal supplied with the address signal and the other input terminal supplied with the security data.

* * * * *